July 21, 1959
P. A. CASTRUCCIO ET AL
2,896,093
PULSE LENGTH DISCRIMINATOR
Filed Feb. 27, 1956
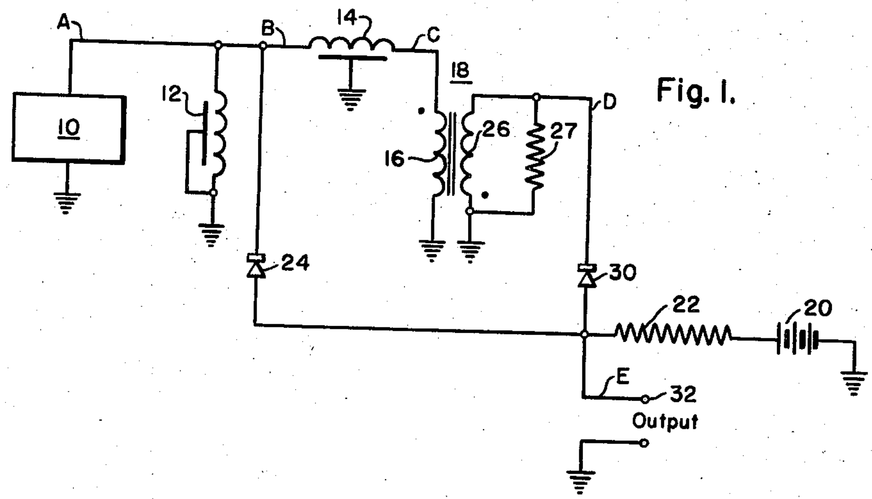
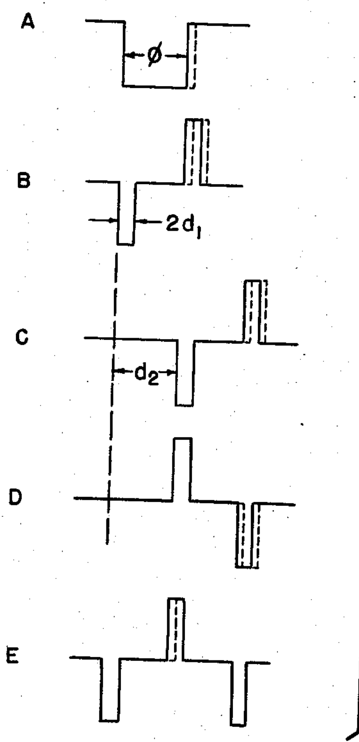
Fig. 2.
WITNESSES:
Bernard R. Giegues
T. H. Murray
INVENTORS
Peter A. Castruccio and
Martin G. Woolfson.
BY
F. E. Browder
ATTORNEY United States Patent Office 2,896,093

Patented July 21, 1959

2,896,093

PULSE LENGTH DISCRIMINATOR

Peter A. Castruccio and Martin G. Woolfson, Baltimore, Md., assignors to Westinghouse Electric Corporation, East Pittsburgh, Pa., a corporation of Pennsylvania Application February 27, 1956, Serial No. 567,886

6 Claims. (Cl. 307—88.5)

This invention relates to pulse length or pulse width discriminators and more particularly to a pulse length discriminator circuit which does not employ vacuum tubes as elements.

In certain applications of electronic equipment it becomes necessary to provide apparatus for accepting voltage pulses of a particular pulse length while rejecting all other pulse lengths. One possible application of such apparatus is in a radar beacon-interrogator system which must accept energy pulses of a particular pulse length while rejecting all other energy pulses so that the system may concentrate on answering interrogators that desire to detect it.

It is an object of this invention to provide a new and improved pulse length discriminator circuit.

More specifically, an object of the invention lies in the provision of a pulse length discriminator circuit which employs elements other than vacuum tubes. With this type of construction, the circuit is more rugged and more reliable in construction and can be used in installations where vacuum tubes would be unacceptable.

Other objects and features of the invention will become apparent from the following detailed description taken in connection with the accompanying drawings which form a part of this specification and in which:

Figure 1 is a schematic circuit diagram of one embodiment of the invention; and

Fig. 2 illustrates idealized wave forms appearing at various points in the circuit of Fig. 1.

Referring to Fig. 1, the circuit shown comprises a source of square wave voltage pulses 10, having one terminal grounded. Between the other terminal of source 10 and ground is connected a first shorted delay line 12. A shorted delay line of this type reflects back to its input a wave equal in width to the input wave, but of opposite polarity and delayed by twice the delay of the delay line. In parallel with delay line 12 is a second delay line 14 and the primary winding 16 of a pulse transformer 18.

A source of direct current voltage, such as battery 20, has its negative terminal grounded and its positive terminal connected through resistor 22 to the anode of a unidirectional current device 24. The cathode of unidirectional current device 24 is connected to the junction of delay lines 12 and 14, substantially as shown.

The secondary winding 26 of pulse transformer 18 has its one terminal grounded and is wound so that pulses on winding 26 are inverted in phase with respect to pulses on winding 16 as indicated in the drawing by dots. A resistor 27 is connected in shunt with winding 26, and the ungrounded terminal of winding 26 is connected through unidirectional current device 30 to the junction of the anode of unidirectional current device 24 and resistor 22. An output signal is derived between terminal 32 and ground.

Operation of the circuit may best be understood by reference to Fig. 2 where wave forms appearing at various points in the circuit of Fig. 1 are indicated by corresponding reference letters. The output pulses from source 10 are of a negative polarity as shown by wave form A. Since the shorted delay line 12 reflects back to its input a wave equal to the input wave, but of opposite polarity and delayed by twice the delay of the delay line, the first portion of the ingoing pulse is unaltered up to a time equal to twice the delay of the delay line (i.e., $2d_1$). From time $2d_1$ to time $\phi$ (i.e., the time duration or width of the input pulse), there occures a cancellation of the input pulse due to the algebraic addition of the ingoing and reflected waves. From time $\phi$ to time $(\phi + 2d_1)$, the ingoing pulse has disappeared; but the reflected, invetred wave persists. The net result is the wave form B.

The bipolar wave from B is delayed by delay line 14 by an amount $d_2$ (wave form C); it is then inverted by pulse transformer 18 which has its secondary winding 26 resistively loaded to provide the correct impedance termination for the delay line 14. The output of transformer 18 (wave form D) thus consists of a positive pulse corresponding to the delayed, leading portion of the input pulse and a negative pulse corresponding to the positive pulse of wave form B. It can be seen that when time $d_2$ is equal to the pulse length $\phi$ of the input pulse, the positive pulses in wave forms B and D will coincide.

Unidirectional current devices 24 and 30, together with resistor 22 and battery 20, act as a coincidence detector which operates as follows: Normally current flows from battery 20 through resistor 22, unidirectional current devices 24 and 30 and the low direct current resistances of delay line 12 and secondary winding 26 to ground. Point E is thus at a low positive potential. When either of the cathodes of devices 24 or 30 is hit by a positive pulse, it rises in potential. The other diode, however, still conducts to ground so that point E experiences a small or negligible voltage increase.

If the cathodes of both of the devices 24 and 30 are simultaneously hit by positive pulses, both cathodes rise in potential. Unidirectional current devices 24 and 30 are thus cut off and the voltage at point E rises until conduction is again initiated in one of the unidirectional current devices. The voltage at E thus rises by an amount equal to the smallest of the two positive pulses acting on the cathodes of devices 24 and 30.

The circuit yields zero output at terminal 32 unless the positive pulses in wave forms B and D coincide in time. In the latter event, the output has an amplitude equal to the smallest amplitude of the two pulses. The positive pulses in wave forms B and D will coincide to produce an output pulse having a length equal to $2d_1$ only when the pulse length of the input pulse is substantially equal to the time delay $d_2$ of delay line 14. However, if the pulse length of the input pulse is slightly smaller or larger than the time $d_2$, there will be a partial coincidence as shown by the dotted wave forms, and a reduced width output pulse will be produced. In this manner, an output pulse will be produced when the input pulse length is $d_2$ plus or minus the amount $2d_1$. The percentage error departure from true coincidence may obviously be reduced by shortening the delay time $d_1$ of delay line 12.

Although the invention has been described in connection with a certain specific embodiment, it should be apparent to those skilled in the art that various changes in form and arrangement of parts can be made to suit requirements without departing from the spirit and scope of the invention. In this respect, it should be readily apparent that a conventional vacuum tube coincidence detector could be used in the place of elements 20, 22, 24 and 30 shown in the present embodiment. Also, the invention may be used in conjunction with positive polarity input pulses by reversing the sign of battery 20 and the direction of current flow through semiconductors 24 and 30.

We claim as our invention:

1. In combination with a source of voltage pulses, a pulse length discriminator comprising a first delay line connected across said source of voltage pulses, a current path including a second delay line and the primary winding of a pulse transformer connected in parallel with said first delay line, a source of direct current voltage having its negative terminal connected to one end of said first delay line, a first unidirectional current device having its cathode connected to the other end of said first delay line, an impedance connecting the anode of said first unidirectional current device to the positive terminal of said direct current voltage source, a secondary winding for said pulse transformer having its one end connected to the negative terminal of said direct current voltage source, a second unidirectional current device having its cathode connected to the other end of said secondary winding and its anode connected to the anode of said first unidirectional current device, and connections for deriving an output voltage between the negative terminal of said direct current voltage source and the junctions of the anodes of said unidirectional current devices.

2. In combination with a source of voltage pulses, a pulse length discriminator comprising a first delay line connected across said source of voltage pulses, a current path including a second delay line and the primary winding of a pulse transformer connected in parallel with said first delay line, a source of direct current potential having its negative terminal connected to one end of said first delay line, a first unidirectional current device and an impedance element connecting the other end of said first delay line to the positive terminal of said direct current potential source, a secondary winding for said pulse transformer having its one end connected to said negative terminal, a second unidirectional current device connecting the other end of said secondary winding to the junction of said impedance element and said first unidirectional current device, and connections for deriving an output voltage proportional to the voltage drop across said impedance element.

3. In combination with a source of voltage pulses, a pulse length discriminator comprising a first delay line connected across said source of voltage pulses, a current path including a second delay line and the primary winding of a pulse transformer connected in parallel with said first delay line, a secondary winding for said pulse transformer, a source of direct current voltage, a first unidirectional current device connecting the positive terminal of said voltage source to the junction of said first and second delay lines, and a second unidirectional current device connecting said positive terminal to one side of said secondary winding.

4. In combination with a source of voltage pulses, a pulse length discriminator comprising first delay line means connected across said source of voltage pulses, a current path including second delay means and the primary winding of a pulse transformer connected in parallel with said first delay means, a secondary winding for said pulse transformer, a source of direct current potential, an impedance connecting the positive and negative terminals of said voltage source, a first unidirectional current device connecting one end of said first delay means to one end of said impedance element, and a second unidirectional current device connecting one end of said secondary winding to said one end of the impedance element.

5. In combination with a source of voltage pulses, a pulse length discriminator comprising first delay line means connected across said source of voltage pulses, a current path including second delay line means and the primary winding of a pulse transformer connected in parallel with said first delay means, a secondary winding for said pulse transformer, and means operatively connected to said first delay line means and to said second delay line means for comparing in phase voltage pulses appearing across said first delay line means with pulses appearing across said secondary winding.

6. In combination with a source of voltage pulses, a pulse length discriminator comprising first delay line means connected across said source of voltage pulses, a current path including second delay line means and the primary winding of a pulse transformer connected in parallel with said first delay line means, a secondary winding for said pulse transformer, a source of direct current potential, an impedance connecting the positive and negative terminals of said voltage source, a first unidirectional current device connecting one end of said first delay means to one end of said impedance element, and a second unidirectional current device connecting one end of said secondary winding to said one end of the impedance element, with the delay of the first means being equal to some predetermined fraction of the pulse duration of pulses from said source of voltage pulses and in which the delay of the second means is substantially equal to the aforesaid pulse duration.

References Cited in the file of this patent

UNITED STATES PATENTS

| | | |
|---|---|---|
| 2,543,431 | Bess | Feb. 27, 1951 |
| 2,596,142 | Gerwin | May 13, 1952 |
| 2,631,277 | Skoller | Mar. 10, 1953 |
| 2,636,133 | Hussey | Apr. 21, 1953 |
| 2,673,936 | Harris | Mar. 30, 1954 |
| 2,677,760 | Bess | May 4, 1954 |
| 2,703,364 | Birnbaum | Mar. 1, 1955 |
| 2,758,206 | Hamilton | Aug. 7, 1956 |

FOREIGN PATENTS

| | | |
|---|---|---|
| 693,769 | Great Britain | July 8, 1953 |